(No Model.)

C. B. BOYNTON.
Drill Teeth.

No. 230,733. Patented Aug. 3, 1880.

Witnesses:
J. Walter Fowler,
R. K. Evans

Inventor;
Chandler B. Boynton
by A. N. Evans & Co
Attys.

UNITED STATES PATENT OFFICE.

CHANDLER B. BOYNTON, OF HASTINGS, MINNESOTA.

DRILL-TOOTH.

SPECIFICATION forming part of Letters Patent No. 230,733, dated August 3, 1880.

Application filed June 11, 1880. (No model.)

*To all whom it may concern:*

Be it known that I, CHANDLER B. BOYNTON, of Hastings, in the county of Dakota and State of Minnesota, have invented certain new and useful Improvements in Drill-Teeth; and I hereby declare that the following is a full, clear, and exact description thereof, reference being had to the accompanying drawings, making part of this specification, and in which—

Figure 1:
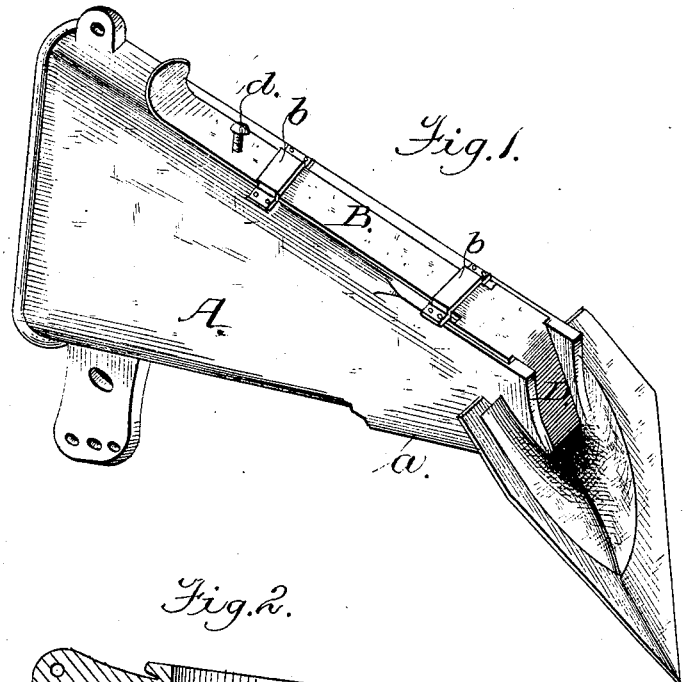
Figure 2:
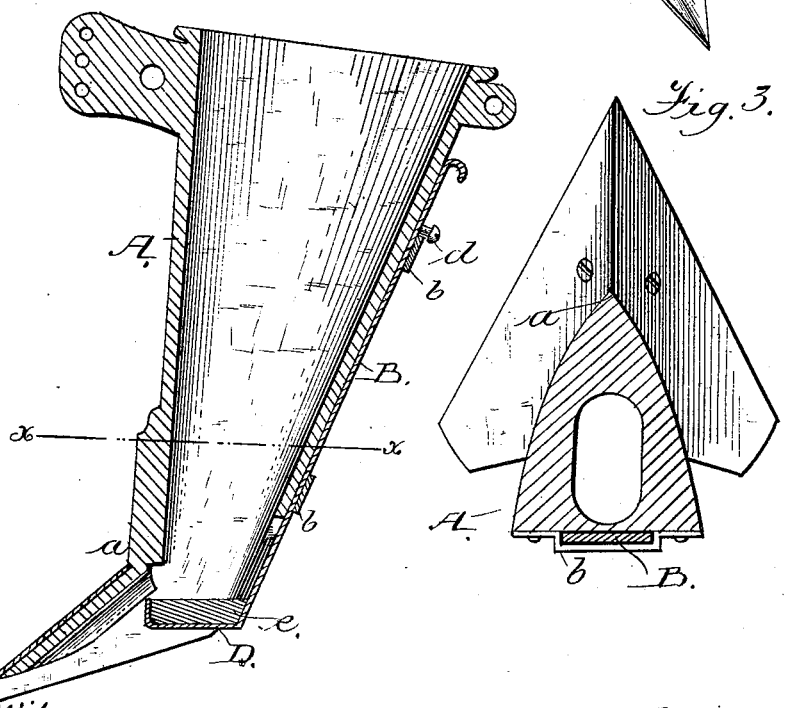
Figure 3:
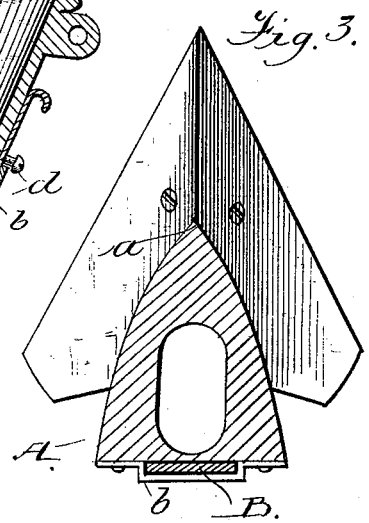

Figure 1 is a perspective view of my drill-tooth. Fig. 2 is a vertical section of the same. Fig. 3 is a horizontal section on line $x$ $x$ of Fig. 2.

My invention relates to the drill-tooth, and has for its object to distribute the grain under the earth broken by the share of the drill-tooth; and it consists in a drill-tooth combined with a vertical slide having a beveled foot which lies beneath the opening through the tooth, and so arranged that the falling grain strikes the beveled foot and is deflected and scattered beneath the share, as hereinafter more fully described and claimed.

In order that those skilled in the art may make and use my invention, I will proceed to describe the exact manner in which I have carried it out.

In the drawings, A is the tooth, cast with proper devices near the top for fastening it to the drill. The lower portion of the tooth is cast with a heavy projecting sharp rib, $a$, to strengthen the tooth and divide the soil. The rear of the tooth is flattened, and is provided with guides $b$ $b$, inclosing a gravity-slide, B, having a stop, $d$, which limits its downward movement. The lower end, D, of slide is turned across the opening in the lower end of the tooth, forming a sort of foot, on the upper surface of which is secured a beveled block, $e$. The sharp angle extends upward and lies in the line of the fall of the grain.

As the grain falls through the tooth it strikes the beveled block, and the angular sides deflect it to the right and left, so as to scatter it beneath the share of the drill-tooth.

The vertical movement allowed the slide B allows it to close the tooth-opening as the point enters the ground, thereby preventing the soil from being forced into the tooth; and as soon as the tooth moves forward the slide drops, so that the grain passes out under the double share.

Having thus described my invention, I claim as new and desire to secure by Letters Patent—

The slide B, provided with the beveled-faced foot D $e$ below the opening of the tooth, in combination with a grain-drill tooth, substantially as set forth.

CHANDLER B. BOYNTON.

Attest:
J. R. CLAGETT,
JASPER H. SEARLES.